United States Patent
Kauschke et al.

(10) Patent No.: US 6,331,268 B1
(45) Date of Patent: Dec. 18, 2001

(54) NONWOVEN FABRIC WITH HIGH CD ELONGATION AND METHOD OF MAKING SAME

(75) Inventors: Michael Kauschke, Rimsting (DE); Mordechai Turi, Princeton Junction, NJ (US)

(73) Assignee: First Quality Nonwovens, Inc., State College, PA (US)

( * ) Notice: Subject to any disclaimer, the term of this patent is extended or adjusted under 35 U.S.C. 154(b) by 0 days.

(21) Appl. No.: 09/373,826

(22) Filed: Aug. 13, 1999

(51) Int. Cl.$^7$ ............ B29C 43/00; D04H 3/08; D01G 25/00
(52) U.S. Cl. ............ 264/518; 264/517; 264/555; 156/167; 156/181; 19/299; 442/401
(58) Field of Search ............ 162/102, 109, 162/116, 146, 157.1, 24, 217, 296, 297, 351, 363, 374, 383; 428/105, 113, 167, 179; 442/327, 401; 264/555, 518; 156/166, 167, 180, 181, 441

(56) References Cited

U.S. PATENT DOCUMENTS

| | | | |
|---|---|---|---|
| H1674 | 8/1997 | Ames et al. ............ 604/389 |
| 2,986,780 | 6/1961 | Bletzinger ............ 19/156 |
| 3,034,180 | 5/1962 | Greiner et al. ............ 19/155 |
| 3,284,857 | 11/1966 | Hynek ............ 19/161 |
| 3,775,244 | * 11/1973 | Hubschmann ............ 162/351 |
| 3,791,920 | * 2/1974 | Nisser et al. ............ 162/363 |
| 3,973,291 | 8/1976 | Kolbach ............ 19/148 |
| 4,075,382 | 2/1978 | Chapman et al. ............ 428/192 |
| 4,103,058 | 7/1978 | Humlicek ............ 428/171 |
| 4,186,463 | * 2/1980 | Marshall ............ 19/304 |
| 4,375,446 | 3/1983 | Fujii et al. ............ 264/518 |
| 4,405,297 | 9/1983 | Appel et al. ............ 425/72 |
| 4,442,062 | 4/1984 | Fujii et al. ............ 264/518 |
| 4,481,694 | 11/1984 | Dilo ............ 19/296 |
| 4,627,811 | 12/1986 | Greiser et al. ............ 425/72 |
| 4,741,877 | 5/1988 | Mullane, Jr. ............ 264/504 |
| 4,742,941 | * 5/1988 | Englebert et al. ............ 428/71 |
| 4,834,741 | 5/1989 | Sabee ............ 604/385.2 |
| 4,838,774 | 6/1989 | Balk ............ 425/66 |
| 4,936,934 | 6/1990 | Buehning ............ 156/167 |
| 4,968,313 | 11/1990 | Sabee ............ 604/385.2 |
| 5,156,793 | 10/1992 | Buell et al. ............ 264/288.8 |
| 5,167,897 | 12/1992 | Weber et al. ............ 264/288.8 |
| 5,211,903 | 5/1993 | Refifenhauser ............ 264/555 |
| 5,236,430 | 8/1993 | Bridges ............ 604/396 |
| 5,246,433 | 9/1993 | Hasee et al. ............ 604/396 |
| 5,314,325 | 5/1994 | Bosler ............ 425/384 |
| 5,460,500 | 10/1995 | Geus et al. ............ 426/66 |
| 5,464,401 | 11/1995 | Hasee et al. ............ 604/385.1 |
| 5,487,655 | 1/1996 | Frey et al. ............ 425/72.2 |
| 5,507,736 | 4/1996 | Clear et al. ............ 604/385.2 |
| 5,527,304 | 6/1996 | Buell et al. ............ 604/385.2 |
| 5,626,571 | 5/1997 | Young et al. ............ 604/370 |

(List continued on next page.)

*Primary Examiner*—Peter Chin
*Assistant Examiner*—Eric Hug
(74) *Attorney, Agent, or Firm*—Amster, Rothstein & Ebenstein

(57) ABSTRACT

A nonwoven fabric from spun fibers wherein the density of the spun fibers in the fabric varies between strips of relatively high density and strips of relatively low density. The strips extend along the length of the fabric in the machine direction in an alternating pattern, with the high density strips separated from each other by low density strips. The alternating high density and low density strips provide the fabric with a higher percent elongation in the cross direction than in the machine direction. The alternating pattern is achieved through use of a pattern screen defining a plurality of elongated air permeable regions separated by elongated substantially or relatively air impermeable regions, the elongated regions extending in the machine direction in an alternating pattern, with the air permeable regions separated from each other by the substantially or relatively air impermeable regions.

20 Claims, 5 Drawing Sheets

U.S. PATENT DOCUMENTS

| | | | |
|---|---|---|---|
| 5,736,219 | 4/1998 | Suehr et al. | 428/113 |
| 5,762,253 * | 6/1998 | Aberg et al. | 226/95 |
| 5,865,003 * | 2/1999 | Klett et al. | 52/518 |
| 5,906,840 | 5/1999 | Bosler et al. | 425/388 |
| 6,030,686 | 2/2000 | Suehr et al. | 428/113 |

* cited by examiner

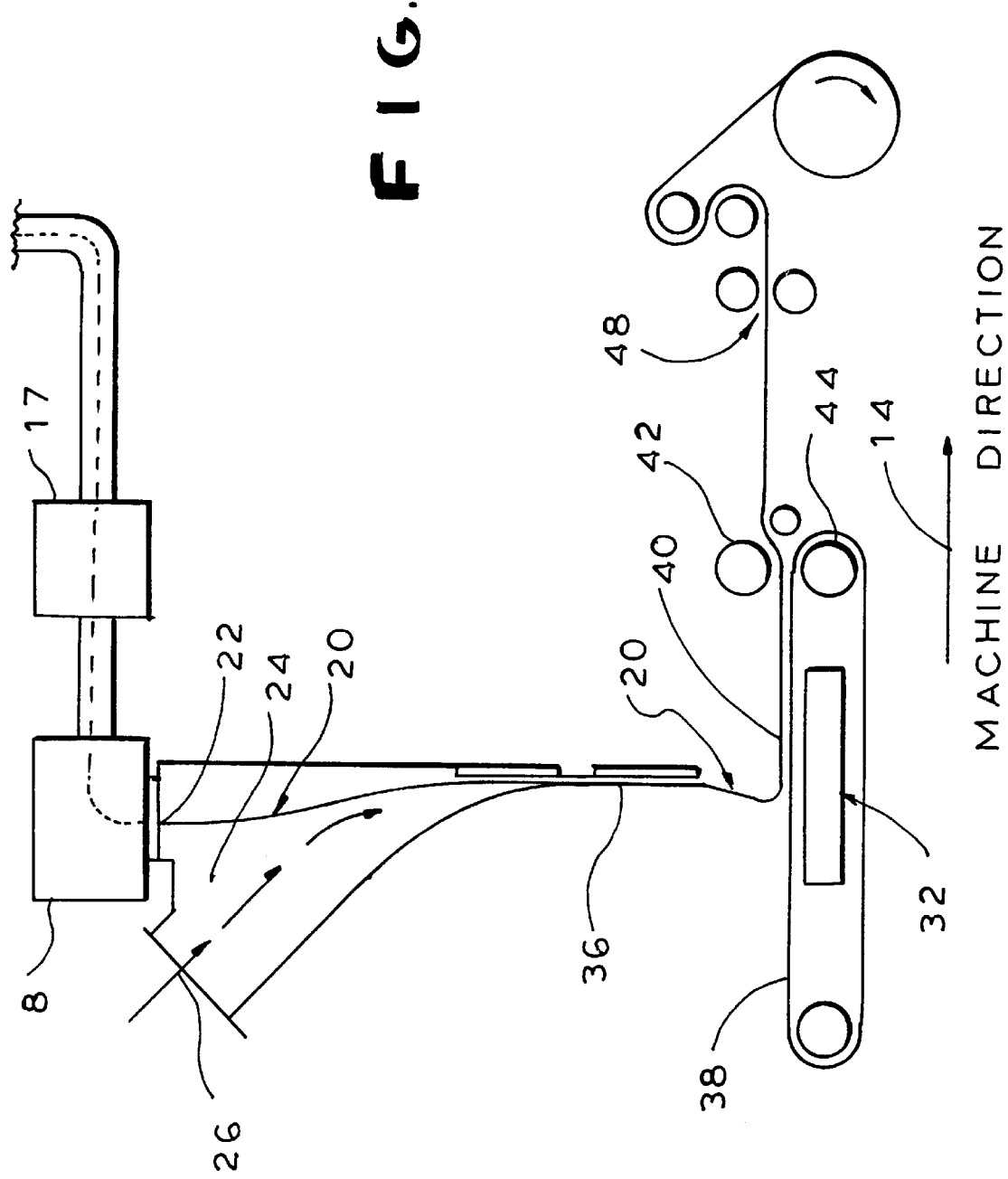

NONWOVEN FABRIC WITH HIGH CD ELONGATION AND METHOD OF MAKING SAME

BACKGROUND OF THE INVENTION

The present invention relates to a nonwoven having a filament density pattern yielding low tensile strength and high percent elongation in a first direction (e.g., CD) and high tensile strength and low percent elongation in a second direction (e.g., MD), and a method of making such a nonwoven.

Spunbond nonwoven fabrics are made of continuous strands or filaments that are laid down on a moving conveyor belt in a randomized distribution. In a typical spunbond process, resin pellets are processed under heat to a melt and then fed through a spinnerette to create hundreds of thin filaments or threads. Jets of air cause the threads to be elongated, and the threads are then blown onto a moving web where they are laid down and sucked against the web in a random pattern to create a fabric. The filament density of the fabric is typically fairly uniform and symmetrically extending in both the machine direction (MD) and the cross direction (CD) (at least this is the goal). The fabric then passes through a bonding station. Bonding is necessary because the filaments or threads are not woven together.

Other nonwoven fabrics include fabrics made from staple fibers, meltblown fibers, carded fibers and and short cut fibers. As used herein the terms "spun fibers" and "fibers" include the spun filaments described above as well as staple fibers, meltblown fibers, carded fibers and and short cut fibers.

A non-uniform and non-symmetrical fiber density pattern could result in a fabric with an expected elongation in one direction (e.g., MD), but an unexpected increased elongation in the other direction (e.g., CD). This is desired in situations where minimal elongation is required in the machine direction and yet high elongation is required in the cross direction. For example, any elongation in the machine direction will disrupt the converting machines that are used to make diapers, while substantial elongation in the cross direction is desired to give each individual diaper some give around the wearer's waist.

Accordingly, it is an object of the present invention to provide a nonwoven fabric having a non-uniform fiber density pattern and a method of making such fabric.

Another object of the present invention is to provide a nonwoven fabric and method of making same wherein the fabric is highly extensible in a first direction (typically the CD) as compared to a second direction (typically the MD).

Another object of the present invention is to provide a nonwoven fabric and method of making same wherein the fibers of the fabric are oriented more in the MD than in the CD thereby providing higher tensile strength in the MD than in the CD.

Another object is to provide such a method and fabric wherein the nonwoven fabric has low tensile strength and high percent elongation in the first direction (typically the CD), and high tensile strength and low percent elongation in the second direction (typically the MD).

It is a further object to provide such a method and fabric wherein the density of the fibers in the fabric varies between strips of relatively high density and strips of relatively low density, the strips extending substantially continuously along the length of the fabric in the machine direction in an alternating pattern.

It is a still further object of the invention to provide such a fabric wherein less fibers are bonded together in the strips of relatively low fiber density than in the strips of relatively high fiber density.

It is a still further object of the invention to provide such a fabric which provides increase liquid wicking in the strips of relatively high fiber density and increased liquid strike-through in the strips of relatively lower fiber density.

It is a still further object of the invention to provide such a fabric which has a shrinkage differential between the strips of relatively high fiber density and the strips of relatively lower fiber density when the fabric is exposed to heat, with greater shrinkage in the strips of relatively high fiber density.

It is also an object of the present invention to provide such a method which is simple and economical to use and maintain.

SUMMARY OF THE INVENTION

It has now been found that the above and related objects of the present invention are obtained in a nonwoven fabric formed from spun fibers wherein the density of the spun fibers in the fabric varies between strips of relatively high density and strips of relatively low density, the strips extending along the length of the fabric in the machine direction in an alternating pattern. The high density strips are separated from each other by low density strips, the alternating high density and low density strips providing the fabric with a higher percent elongation in the cross direction than in the machine direction. The method comprises the steps of forming a flowing stream of spun fibers and moving an air permeable member over a suction box and across the path of the fiber stream to intercept and collect the fibers on one face of the air permeable member and to bond the collected fibers together to form a nonwoven fabric. A pattern screen is provided, the pattern screen defining a plurality of elongated air permeable regions separated by elongated relatively air impermeable regions, the elongated regions extending in the machine direction in an alternating pattern, with the air permeable regions separated from each other by the relatively air impermeable regions. The pattern screen is positioned in relation to the air permeable member and the suction box to cause the fibers to be collected on the one face of the air permeable member so as to form a fabric having a density that varies between strips of relatively high density and strips of relatively low density. The strips extend along the length of the fabric in the machine direction in an alternating pattern, with the high density strips separated from each other by low density strips, the alternating high density and low density strips providing the fabric with a higher percent elongation in the cross direction than in the machine direction. The collected fibers are then separated from the air pervious member.

In a preferred embodiment, the relatively air impermeable regions disrupt the air flow directly above the air pervious member, and the pattern screen comprises longitudinally extending and transversely spaced air impermeable baffle bars. The pattern screen is preferably below the suction box cover, in the plane of the suction box cover, between the suction box cover and the air permeable member, or part of the air permeable member (i.e., on the top of, on the bottom of or within the air permeable member).

The present invention also encompasses a method of making a nonwoven fabric embodying spun fibers deposited in a patterned formation providing a higher percent elongation in CD than in MD. The method comprises the steps of forming a flowing stream of spun fibers, and moving an air pervious member over a suction box cover and across the path of the fiber stream to intercept and collect the fibers on one face of the air pervious member. A pattern screen is disposed as the suction box cover, thereby to cause the fibers to be collected on the one face of the air pervious member in a pattern determined by the pattern on the pattern screen and to bond the collected fibers together to form a nonwoven fabric. The pattern defines an air pervious area/air impervious area ratio which is greater in MD than in CD, thereby to provide a fabric with a higher percent elongation in CD than in MD. The collected fibers are then separated from the air pervious member.

In a preferred embodiment, the pattern screen comprises longitudinally extending and transversely spaced substantially air impermeable baffle bars thereby to impose the pattern of the baffle bars on the suction exerted on the filaments by the suction box. The apertures of the air pervious member define a regular non-oriented pattern.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 1 is a fragmentary schematic illustrating a spunbonding process;

DETAILED DESCRIPTION OF THE PREFERRED EMBODIMENTS

Figure 2A:
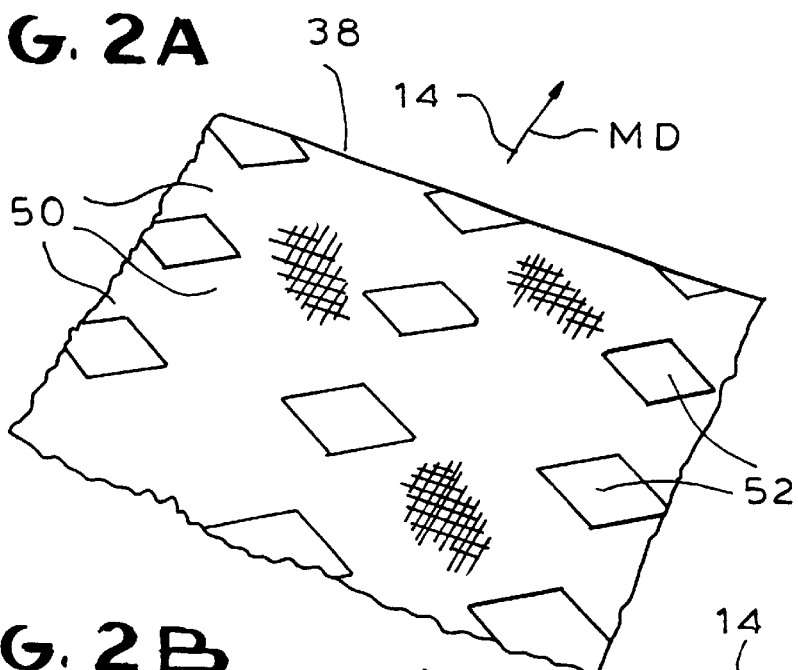
FIGS. 2A, 2B and 2C are fragmentary top plan views of an air permeable member (such as a conveyor) for use in the present invention.

Referring now to the drawing, and in particular FIG. 1 thereof, therein illustrated is a typical apparatus for making spunbond fabric out of plastic, such as polypropylene. Specifically, polypropylene pellets are processed under heat to a melt in heater 17 and then supplied to a spinnerette 18. The spinnerette 18 includes an outflow plate 22, with a plurality of holes. The melted polypropylene is forced through the many holes and forms hundreds of thin endless filaments or threads 20. Air 26 (injected through conduit 24) is used to lengthen the filaments 20 and thin the diameter of the filaments 20. The filaments 20 are then laid down or "collected" on a moving air permeable member, such as conveyor belt 38 which travels over the suction box cover, and to bond the collected fibers together to form a nonwoven fabric 40. Fabric 40 then optionally passes through compaction rollers 42 and 44 and a bonding station 48.

A suction box 32 is located under conveyor belt 38 and creates a vacuum to pull down the fibers 20 onto the belt 38 and to keep the air flow 26 moving in the downward direction. Accordingly, the conveyor belt 38 is porous or permeable to air, and the top or cover of the suction box 32 is also porous or permeable to air. Typically, the top of the prior art suction box 32 is a simple metal grating which is uniform in both the machine direction 14 (MD) and the cross direction 12 (CD) so that the resulting fabric is also uniform in both orthogonal directions. Similarly, the belt allows air flow in a uniform manner so that the spunbond filaments will lie flat on the belt in a random, but generally uniform, manner in both orthogonal directions. Since the air flow causes the filaments to lie down, any disruption in the air flow (such as a large spot of dirt on the belt or suction box cover) will result in fewer filaments directly above the spot.

It has now been found that in some instances it would be preferable to have a non-uniform lay-down of spun fibers (e.g. the spunbond filaments) on the belt in the cross direction. In order to achieve this, in a preferred embodiment a special suction box cover is utilized, which cover is not uniform when comparing the machine direction to the cross direction. Specifically, the suction box cover includes a plurality of air impermeable bars which all extend in the machine direction. These bars disrupt the vertical air flow with the result that the fabric formed on the web will have alternating lanes of more fibers and fewer fibers. The bars can be completely air impermeable or substantially air impermeable (e.g. the bars could be formed with small holes therein) so long as the bars cause a disruption of the air flow at the point where the fibers are laid onto the moving web. In essence, the fabric will be striped in the machine direction. By disrupting the air flow at the point where the fibers are laid onto the moving web or conveyor belt, lanes having a high density of fibers are juxtaposed next to lanes having a low density of fibers, all of these lanes running in the machine direction. The end result is a nonwoven fabric 40 which has the expected or standard tensile strength and percent elongation in the machine direction 14, but decreased tensile strength and increased percent elongation in the cross direction 12. This is desired where minimal elongation is required in the machine direction, but high elongation is required in the cross direction.

Referring now to FIG. 2A in particular, the air permeable member 38 serving as the conveyor belt for the collected filaments 40, according to the present invention, may be initially created as a pattern of air permeable perforated areas 50 and substantially or relatively air impermeable non-perforated areas 52 (the non-perforated areas 52 being designated by white diamonds or parallelograms and the perforated areas 50 being designated by cross-hatching). The non-perforated areas 52 are closer together along the MD 14 than along the CD 12. Accordingly, the effect of the conveyor belt 38 is to modify the suction exerted on the falling filaments 20 by the suction box 32 in such a manner that the filaments 20 will tend to congregate (and thereby assume a higher filament density or weight per unit area) in the MD extending rows formed by the air permeable perforated areas 50 relative to the CD extending columns formed by the air impermeable imperforate areas 52. The plurality of air permeable areas 50 extend along the length of the fabric in the MD 14 and are transversely separated from one another in the CD 12 by the substantially or relatively air impermeable members 52 extending in the MD 14. Accordingly, the effect of the conveyor belt 38 is to modify the suction exerted on the falling filaments 20 by the suction box 32 in such a manner that the filaments 20 tend to congregate (and thereby assume a higher filament density or weight per unit area) in the MD extending rows formed by the air permeable areas 50 relative to the CD extending columns formed by the substantially or relatively air impermeable areas 52.

Figure 2B:
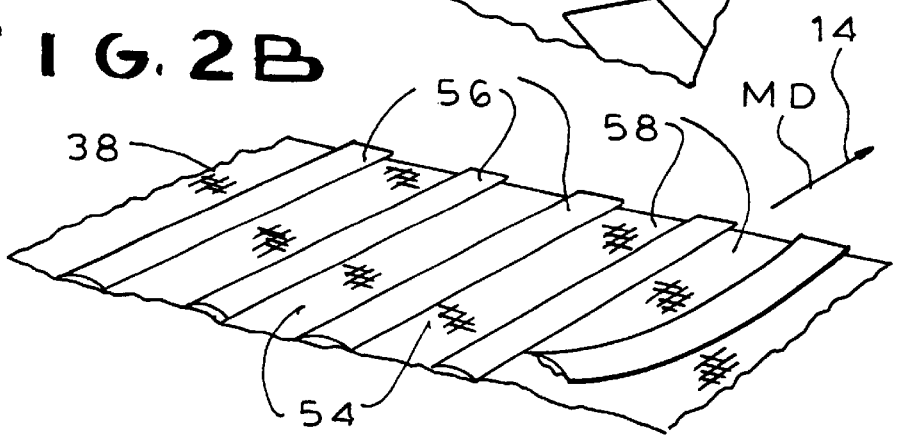

Referring now in particular to FIG. 2B, the conveyor belt 38 is based upon a generally uniform and symmetrically perforated sheet 54 of air permeable material to which has been added a series of endless substantially or relatively air impermeable strips or ribbons 56 which act to block the apertures of the sheet and prevent the passage of air therethrough. The plurality of ribbons 56 extend along the length of the fabric in the MD 14 and are transversely separated from one another in the CD 12 by ribbon-like air permeable areas 58 of the air permeable conveyor belt 38 extending in the MD 14. The substantially or relatively air impermeable areas 58 may be blocked out by applying suitable tape strips or ribbons 56 to the otherwise uniformly and symmetrically air permeable conveyor belt 38, such tapes 56 being adhesively or otherwise secured in place on the conveyor belt 38. The ribbons may be placed on either side of the belt 38, or formed within the belt.

Figure 2C:
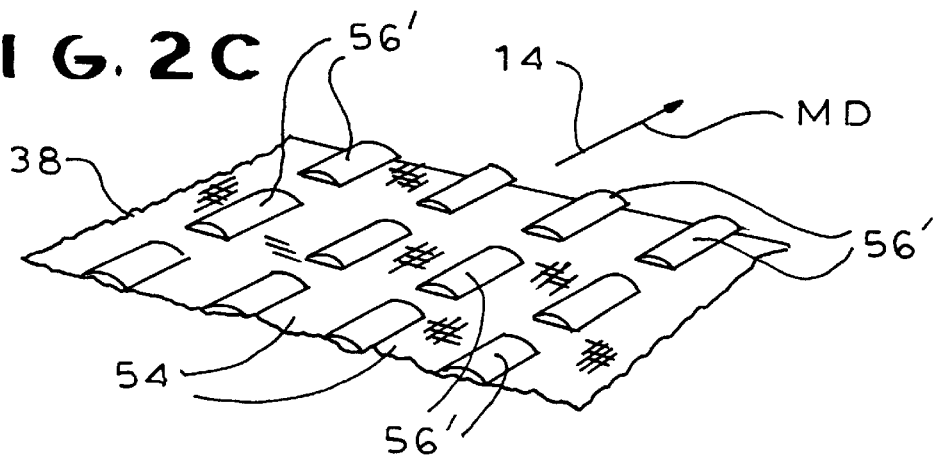

Referring now in particular to FIG. 2C, an alternative arrangement is shown wherein the conveyor belt 38 is based upon a generally uniform and symmetrically perforated sheet 54 of air permeable material to which has been added a series of broken or separated substantially or relatively air impermeable strips or ribbons 56' which act to block the apertures of the sheet and prevent the passage of air therethrough.

As will be obvious to those skilled in the art, different patterns than diamonds (FIG. 2A) or endless or broken ribbons (FIGS. 2B and 2C) may be used to define the substantially or relatively air impermeable portions of the air permeable member. The width of the diamonds or ribbons will determine the width of the strips of alternating high and low fiber density lanes in the resulting fabric. This in turn will determine the amount of elongation in the CD versus MD. Wider lanes of low fiber density and narrower lanes of high fiber density (all extending in the MD) will result in increased elongation and decreased tensile in the CD as compared to the MD. It will be appreciated that the conveyor belts illustrated in FIGS. 2A, 2B and 2C are the functional equivalent of a laminate of a uniformly and symmetrically air permeable conveyor belt and a pattern screen defining substantially or relatively air impermeable areas.

Whether the conveyor belt is specially made to provide a particular pattern of air permeable areas 50 and substantially or relatively air impermeable areas 52 (as illustrated in FIG. 2A), or whether an initially regularly and symmetrically apertured conveyor belt is later specially modified by the placement of substantially or relatively air impermeable ribbons thereon to provide such air permeable areas 58 and substantially or relatively air impermeable areas 56 (as illustrated in FIGS. 2B and 2C), the reliance on a specially manufactured or specially modified conveyor belt could have disadvantages. In particular, the specially formed or specially modified conveyor belts are more expensive. Further, changing of a conveyor belt so as to modify the substantially or relatively air impermeable pattern imposed thereon is time consuming and results in idle time. The time required for pattern changing, and idle time of the apparatus because of such conveyor changing, may be held to a minimum by use of the preferred embodiments of the present invention described hereinbelow.

Figure 3:
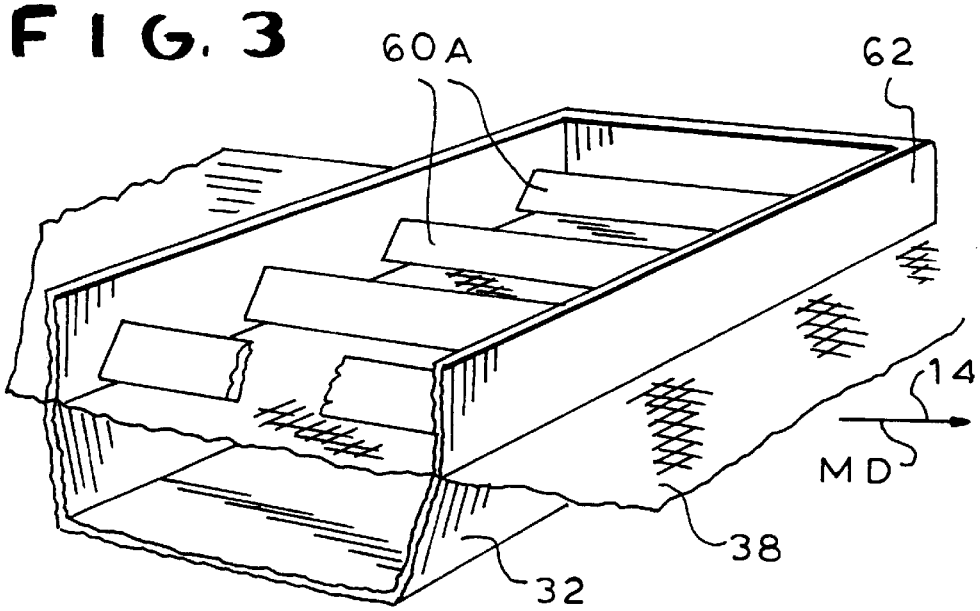
FIG. 3 is a fragmentary isometric view of a suction box providing air impermeable members above the suction box and above the conveyor belt.
Figure 4:
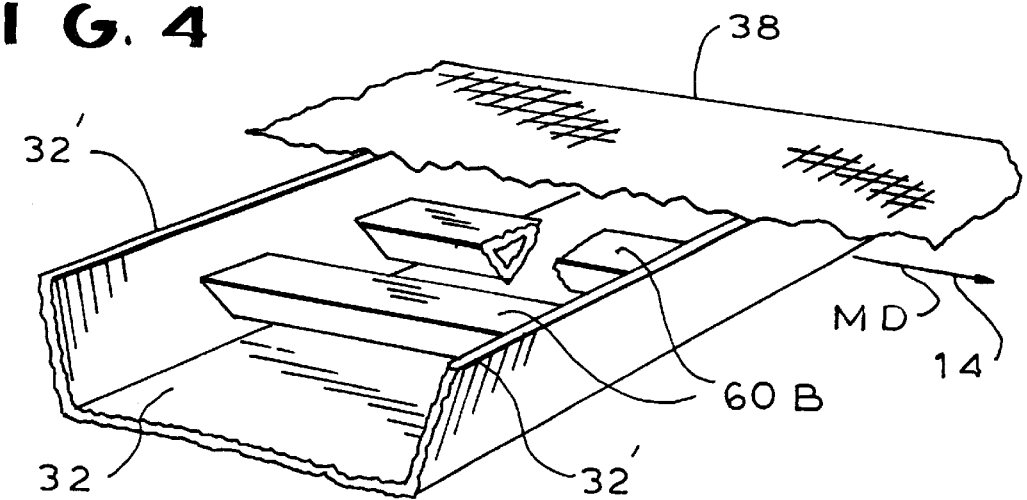
FIG. 4 is a fragmentary isometric view of a suction box providing air impermeable members within the suction box and below the conveyor belt.
Figure 5:
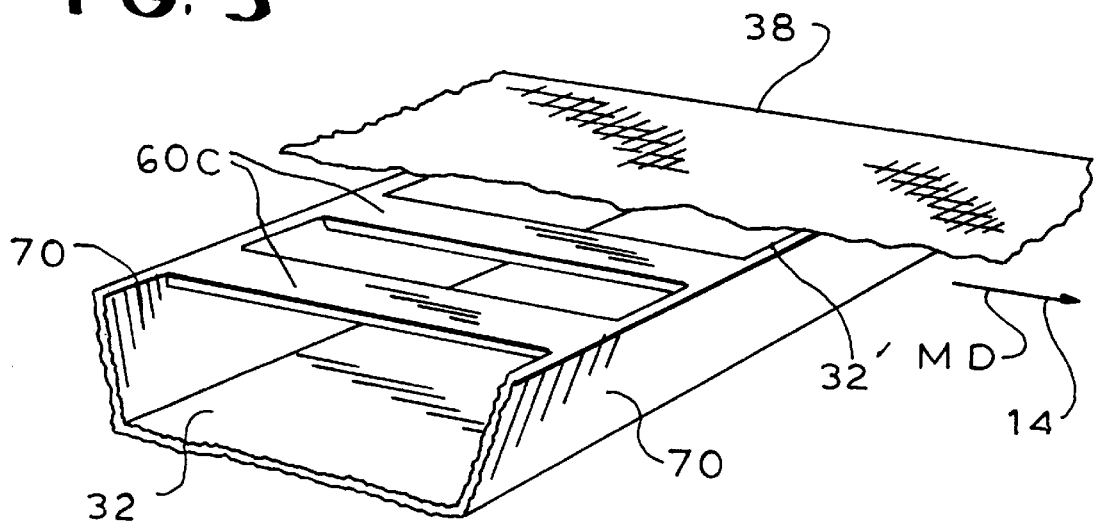
FIG. 5 is a fragmentary isometric view of a suction box having air impermeable members as the suction box cover.

Referring now to FIGS. 3–5, therein illustrated are various suction boxes 32 which can be used, either with conventional conveyor belts 38 defining regular and uniform air permeable patterns or with conveyor belts 38 according to the present invention defining non-regular and non-uniform air permeable patterns. The suction box of FIG. 3 may be used with staple fibers, meltblown fibers, carded fibers or short cut fibers, but is not well suited for use with endless spunbond filaments.

Referring now to FIGS. 3 and 4 in particular, a series of substantially or relatively air impermeable baffle bars 60A extend longitudinally in the MD and are transversely spaced across the CD. While the baffle bars 60A are illustrated as being V-shaped in cross section, clearly they may alternatively be flat, triangular shaped, or the like, so long as they cause fibers 20 to be deposited primarily in the vertically aligned areas between the baffle bars 60A rather than the areas vertically aligned with the baffle bars 60A. As illustrated in FIG. 3, in connection with staple fibers, meltblown fibers, carded fibers and short cut fibers, the baffle bars 60A may be supported, spaced above the conveyor belt upper surface, by a suitable framework such as the upstanding walls of a housing 62 which encloses the area of potential fiber deposition on the conveyor belt 38 above the suction box 32. At least a small amount of such fibers will be carried under such baffle bars 60A and thence onto the permeable member 38 by air currents so that even the low fiber density areas (that is, the band areas vertically aligned with the baffle bars 60A) will contain sufficient fibers so that the fabric 40 formed by the deposited fibers may eventually be stripped off the conveyor belt 38 in one piece.

While FIG. 3 illustrates the baffle bars 60A being disposed above the conveyor belt 38, FIG. 4 illustrates the baffle bars 60B being disposed beneath the conveyor belt 38 and within the suction box 32, preferably slightly below the plane of the suction box cover 32. It is well within the competence of those skilled in the art to ascertain a proper placement of the baffle bars 60B within the suction box 32 so as to form the desired alternating strips of high and low fiber density lanes alternating across the CD. For example, the width of the strips of alternating high and low fiber density lanes on the fabric are determined by the width of the baffle bars 60A, 60B and 60C and the gap between adjacent bars. Wider baffle bars (and smaller gaps therebetween) will result in wider lanes of low fiber density and narrower lanes of high fiber density, yielding an increase in elongation in the CD and a decrease in tensile strength in the CD. The width of the strips of alternating high and low fiber density lanes is also determined by the distance of the baffle bars 60B and 60C from the web 38. For a given baffle bar width, if the bars are moved closer to the web, then the lanes of low fiber density will be increased in width and the lanes of high fiber density will be decreased in width.

Referring now to FIG. 5 in particular, therein illustrated is a suction box 32 wherein the cover 32' thereof defines a plurality of substantially or relatively air impermeable baffle bars 60C longitudinally extending in the MD and transversely spaced in the CD. Conceptually, the suction box cover 32' is essentially a plane that extends across the upper edges of the suction box sidewalls 70. Conventionally, a prior art suction box cover 32' is either completely open, so that there is no impediment to air flow therethrough, or uniformly and symmetrically perforate (permeable), so as to not impart any differential in fiber concentration along the MD and CD directions. However, in a preferred embodiment according to the present invention, as illustrated in FIG. 5, the suction box cover 32' defines a non-uniform and non-symmetrical pattern of substantially or relatively air impermeable baffle bars 60C and thus acts to influence the density of filament deposition on the conveyor belt 38 passing thereover. While the baffle bars 60C are illustrated in FIG. 6 as being of rectangular cross section, clearly they could be of triangular cross section (like the baffle bars of FIGS. 3 and 4), circular, etc.

The baffle bars of FIGS. 3–5 may be easily and rapidly changed so as to minimize downtime of the suction box and related apparatus and, at the same time, avoid the time consumption and expense associated with a need to change the actual conveyor belt.

Accordingly, whether the substantially or relatively air impermeable pattern screen is disposed below the suction box cover (i.e., bars 60B within the suction box, as in FIG. 4), in the plane of the suction box cover (bars 60C, as in FIG. 5), or between the suction box 32' cover and the air permeable member 38 (i.e., bars 60A above the suction box, as in FIG. 3), or is an initial or added air impermeable part of the air permeable member 38 (i.e., areas 52 or strips 56, as in FIGS. 2A and 2B, respectively), in effect the pattern screen defines substantially or relatively air impermeable regions (longitudinally extending in the MD and transversely spaced in the CD) which disrupt the air flow directly above the air permeable member and cause the fabric to have strips of relatively high fiber density and strips of relatively low fiber density, the strips extending along the length of the fabric in the MD direction in an alternating pattern across the CD. The high density strips are separated from each other by low density strips, the alternating high density and low density strips providing the fabric with a higher percent elongation and lower tensile strength in the CD than in the MD. While the pattern screen is positioned in relation to the air permeable member and the suction box, the optimum positioning thereof for any given application may be determined by routine experimentation, as discussed above.

Figure 6:
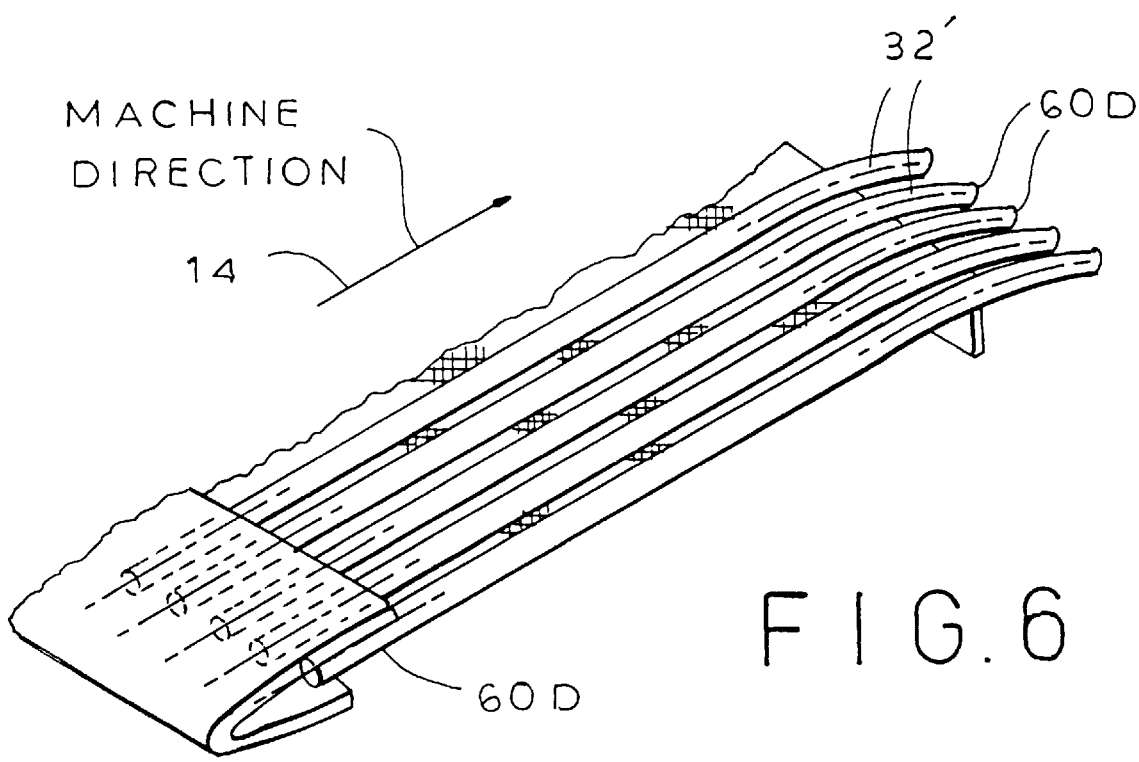
FIG. 6 is a fragmentary isometric view of a suction box cover having air impermeable bars in the nature of circular rods extending in the machine direction and being spaced apart in the cross direction.
Figure 7:
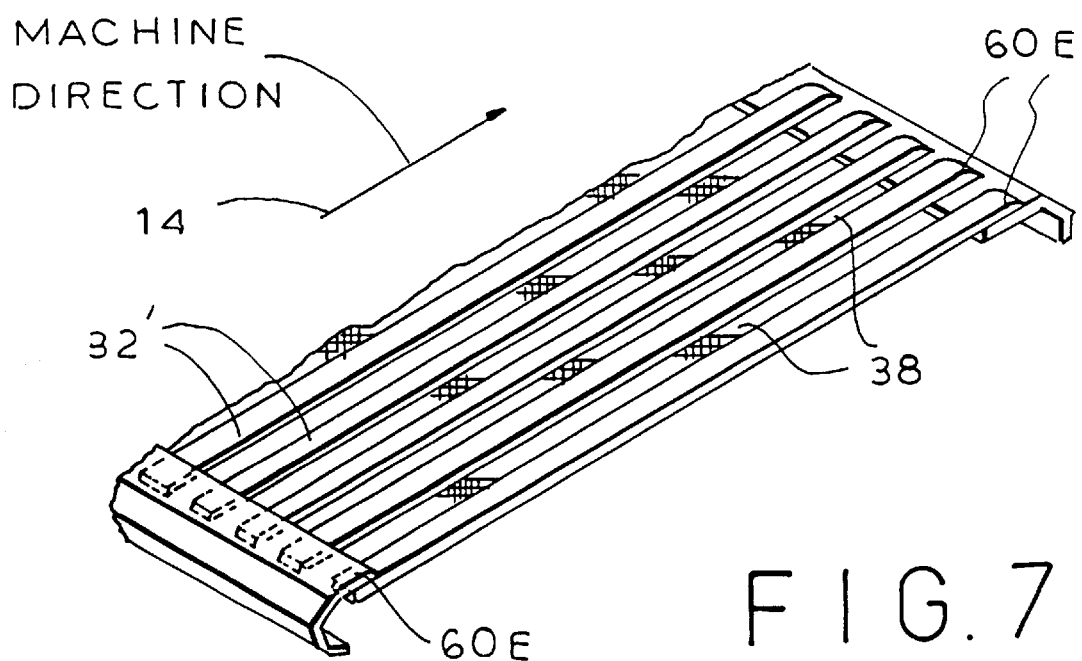
FIG. 7 is a top plan view of a suction box cover having air impermeable bars in the nature of flat strips extending longitudinally in the machine direction and being spaced apart in the cross direction.

Referring now to FIGS. 6 and 7 in particular, therein illustrated are preferred embodiments of the suction box cover 32' of the present invention similar to FIG. 5 (wherein the substantially or relatively air impermeable baffle bars 60C are disposed in the plane of the suction box cover 32'). FIG. 6 illustrates the baffle bars as circular rods 60D, and FIG. 7 illustrates the baffle bars as flat strips 60E. In both instances, the substantially or relatively air impermeable bars 60D, 60E extend axially or longitudinally in the MD 14 and are spaced apart in the CD 12.

As illustrated, the baffle bars 60D, 60E are journaled into the suction box cover 32' at their ends. While the suction box cover 32' may be air permeable throughout, as illustrated the sides of the suction box cover into which the baffle bars 60D, 60E are journaled may be formed of a solid, air impermeable material or of a material with a restricted air flow, while the rest of the suction box cover 32' underneath the bars is uniformly and regularly unrestricted air permeable. The baffle bars may be rotatable or fixed relative to the suction box cover 32'. By way of example, the diameter (width) of the baffle bars 60D (shown in FIG. 6) are 10 mm and the gap between adjacent bars is also 10 mm. Similarly, the width of the baffle bars 60E (shown in FIG. 7) are 10 mm and the gap between adjacent bars is also 10 mm. The web travels directly above the bars so the distance between the bars and the web is effectively zero. This arrangement will typically result in a fabric having lanes of high fiber density approximately 13 mm in width and lanes of low fiber density approximately 7 mm in width. The ratio of weight of the high fiber density lanes to the low fiber density lanes is preferably in the range of 70 to 85% for the high fiber density lanes versus 30 to 15% for the low fiber density lanes, although ranges of 55 to 95% for high density and 45 to 5% for low density are possible.

Utilizing the arrangement shown in FIGS. 6 and 7, nonwoven fabrics of 10 and 15 gsm (grams per square meter) were prepared and tested for both elongation and tensile strength utilizing the EDANA test method ERT 20.289. The tests yielded the following results:

|  | FIG. 7/FIG. 6 | FIG. 7/FIG. 6 |
| --- | --- | --- |
| Basis Weight | 10 gsm | 15 gsm |
| CD tensile N | 8.76/9.51 | 15.19/17.06 |
| CD elongation % | 62.85/57.64 | 67.13/60.07 |
| MD tensile N | 20.28/15.67 | 33.12/21.18 |
| MD elongation % | 47.22/43.13 | 57.43/45.52 |

Figure 8:
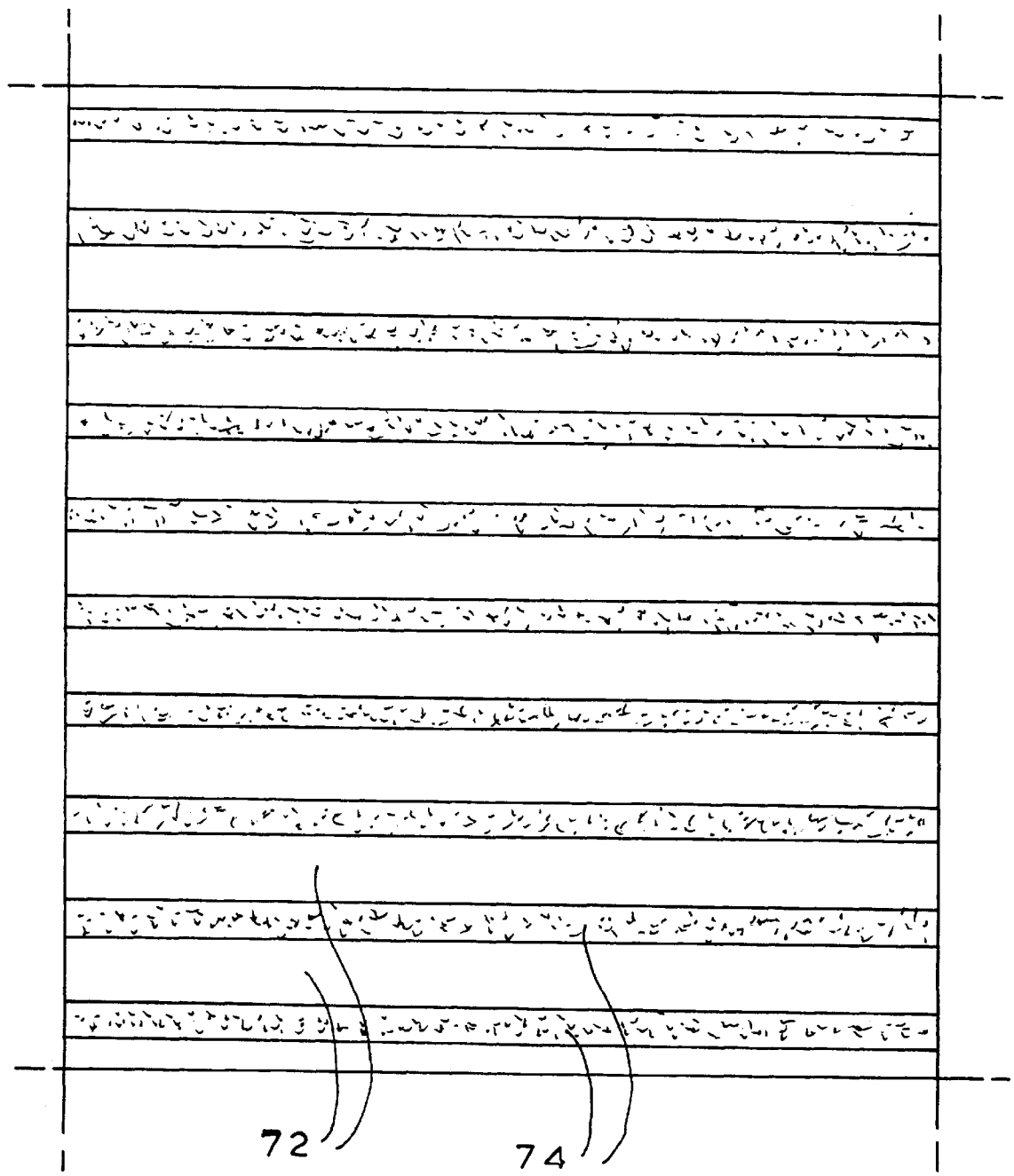
FIG. 8 is a top plan view of the fabric of the invention.

FIG. 8 is shows the fabric of the invention with the high fiber density lanes 72 and the low fiber density lanes 74.

The fabric of the present invention is highly extensible in the first direction (CD) as compared to the second direction (MD). The method of making the fabric of the invention results in the fibers of the fabric being oriented more in the MD than in the CD thereby providing higher tensile strength in the MD than in the CD. Further, in the fabric of the invention less fibers are bonded together in the strips of relatively high fiber density than in the strips of relatively low fiber density thereby providing higher elongation and less tensile in the CD than in the MD.

The fabric of the invention provides increased liquid wicking in the strips of relatively high fiber density and increased liquid strike-through in the strips of relatively lower fiber density. The fabric can be used as CD extensible outer cover material for diapers and the like. The fabric of the invention can be made as described above with multiple spinning positions and suction boxes to increase the thickness of the resulting fabric.

As used herein, "elongation" refers to the percentage elongation of a specimen at the breakpoint, and "tensile" refers to the ultimate tensile strength of a specimen at the breakpoint.

As will be appreciated by those skilled in the art, in order to effect changes in both the MD and CD properties, variations in the preliminary compositions, bonding parameters, and thermodynamic parameters (e.g., the spinning, quenching, cooling and drawing parameters) may be used. Such parameter changes affect both the MD and CD properties. By way of contrast, only the formation of the fiber density pattern of the present invention minimizes the properties in one direction, while maximizing the properties in the other direction.

Once formed, the nonwoven fabric of the present invention is typically subjected to uniform and symmetrical bonding of the substantially randomly oriented fibers in both the MD and CD so that any distinction between the MD and the CD properties arises out of the selective fiber density process of the present invention. However, the selective fiber density process of the present invention may also be applied to a nonwoven fabric which will be bonded asymmetrically in the MD and the CD. See the inventor's copending U.S. patent application Ser. No. 09/374,825, filed Aug. 13, 1999 entitled "Nonwoven With Non-Symmetrical Bonding Configuration"), where the selective bonding pattern promotes a greater percent elongation in the CD than in the MD, then the use of non-uniform fiber density of the initial nonwoven fabric merely enhances the elongation ratio (that is, increases the ratio of elongation in the CD to elongation in the MD). Where the selective bonding pattern of the nonwoven fabric promotes a greater percent elongation in the MD than in the CD, then the non-uniform fiber density of the present invention must be effective to overcome the initial bias and still cause the fabric to have a greater percent elongation in the CD than in the MD.

A preferred embodiment of the present invention provides a method of making a nonwoven fabric from spun fibers wherein the fiber density of the spun fibers in the fabric varies between strips of relative high fiber density and strips of relatively low fiber density, the strips extending along the length of the fabric in the machine direction in an alternating pattern, with the high fiber density strips separated from each other by low fiber density strips. The alternating high density and low density strips across the cross direction provides the fabric with a higher percent elongation in the cross direction than in the machine direction.

To summarize, the present invention provides a nonwoven fabric having a non-symmetrical bonding pattern and, in particular, a low tensile and high elongation in the first direction (typically the CD) and high tensile and low elongation in the second direction (typically the MD) and a method of manufacturing same.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A method of making a nonwoven fabric of substantially randomly oriented continuous spun fibers wherein the density of the fabric formed by the spun fibers varies between strips of relatively high density and strips of relatively low density, the strips extending along the length of the fabric in a first direction in an alternating pattern, with the high density strips separated from each other by low density strips, the alternating high density and low density strips providing the fabric with a higher percent elongation in a second direction than in the first direction, comprising the steps of:

(A) forming a flowing stream of substantially randomly oriented continuous spun fibers on an air permeable member;

(B) moving the air permeable member across the path of the fiber stream and over a suction box to intercept and collect the fibers on one face of the air permeable member and to bond the collected fibers together to form a nonwoven fabric;

(C) providing a pattern screen, the pattern screen defining a plurality of elongated air permeable regions separated by elongated relatively air impermeable regions, the elongated regions extending in the first direction in an alternating pattern, with the air permeable regions separated from each other by the relatively air impermeable regions;

(D) positioning the pattern screen in relation to the air permeable member and the suction box to cause the fibers to be collected on the one face of the air permeable member so as to form a fabric having a density that varies between strips of relatively high density and strips of relatively low density, the strips extending along the length of the fabric in the first direction in an alternating pattern, with the high density strips separated from each other by low density strips, the alternating high density and low density strips providing the fabric with a higher percent elongation in the second direction than in the first direction; and (E) separating the collected fibers from the air pervious member.

2. The method of claim 1 wherein the relatively air impermeable regions disrupt the air flow directly above the air pervious member.

3. The method of claim 1 wherein the pattern screen comprises longitudinally extending and transversely spaced relatively air impermeable baffle bars.

4. The method of claim 1 wherein the pattern screen is below the suction box cover.

5. The method of claim 1 wherein the pattern screen is the suction box cover.

6. The method of claim 1 wherein the pattern screen is between the suction box cover and the air permeable member.

7. The method of claim 1 wherein the pattern screen is part of the air permeable member.

8. A method of making a nonwoven fabric of substantially randomly oriented continuous spun fibers wherein the density of the fabric formed by the spun fibers varies between strips of relatively high density and strips of relatively low density, the strips extending along the length of the fabric in the machine direction in an alternating pattern, with the high density strips separated from each other by low density strips, the alternating high density and low density strips providing the fabric with a higher percent elongation in the cross direction than in the machine direction, comprising the steps of:

(A) forming a flowing stream of substantially randomly oriented continuous spun fibers on an air permeable member;

(B) moving the air permeable member across the path of the fiber stream and over a suction box to intercept and collect the fibers on one face of the air permeable member and to bond the collected fibers together to form a nonwoven fabric;

(C) providing a pattern screen, the pattern screen defining a plurality of elongated air permeable regions separated by elongated substantially air impermeable regions, the elongated regions extending in the machine direction in an alternating pattern, with the air permeable regions separated from each other by the substantially air impermeable regions;

(D) positioning the pattern screen in relation to the air permeable member and the suction box to cause the fibers to be collected on the one face of the air permeable member so as to form a fabric having a density that varies between strips of relatively high density and strips of relatively low density, the strips extending along the length of the fabric in the machine direction in an alternating pattern, with the high density strips separated from each other by low density strips, the alternating high density and low density strips providing the fabric with a higher percent elongation in the cross direction than in the machine direction; and (E) separating the collected fibers from the air pervious member;

the pattern screen comprising longitudinally extending and transversely spaced substantially air impermeable baffle bars disposed below, in the plane of or above the suction box cover for disrupting the air flow directly above the air pervious member.

9. A method of making a nonwoven fabric embodying substantially randomly oriented continuous spun fibers deposited in a patterned formation of fabric density providing a higher percent elongation in CD than in MD, comprising the steps of (A) forming a flowing stream of substantially randomly oriented continuous spun fibers on an air permeable member;

(B) moving the air pervious member across the path of the fiber stream and over a suction box cover to intercept and collect the fibers on one face of the air pervious member and to bond the collected fibers together to form a nonwoven fabric;

(C) disposing a pattern screen as the suction box cover, thereby to cause the fibers to be collected on the one face of the air pervious member in a pattern of fabric density determined by the pattern on the pattern screen, the pattern defining a relatively air pervious area/relatively air impervious area ratio which is greater in MD than in CD, thereby to provide a fabric with a higher percent elongation in CD than in MD; and (D) separating the collected fibers from the air pervious member.

10. The method of claim 9 wherein the pattern screen defines relatively air pervious and relatively air impervious areas.

11. The method of claim 10 wherein the relatively air impervious areas reflect a blockage of apertures in the air pervious member.

12. The method of claim 9 wherein the air pervious member is generally planar over the suction box cover, and the pattern screen is disposed to at least one side of such plane.

13. The method of claim 12 wherein the pattern screen comprises longitudinally extending and transversely spaced relatively air impermeable baffle bars disposed above such plane, thereby to impose the pattern of the baffle bars on the suction exerted through the suction box cover.

14. The method of claim 12 wherein the pattern screen comprises longitudinally extending and transversely spaced relatively air impermeable baffle bars disposed below such plane, thereby to impose the pattern of the baffle bars on the suction exerted through the suction box cover.

15. The method of claim 9 wherein apertures of the air pervious member define a regular non-oriented pattern.

16. The method of claim 9 wherein the pattern defines an elongated relatively air pervious area and an elongated relatively air impervious area.

17. A method of making a nonwoven fabric embodying substantially randomly oriented continuous spun fibers deposited in a patterned formation of fabric density providing a higher percent elongation in CD than in MD, comprising the steps of (A) forming a flowing stream of substantially randomly oriented continuous spun fibers on an air permeable member;

(B) moving the air pervious member defining a regular non-oriented pattern of apertures across the path of the fiber stream and over a suction box cover to intercept and collect the fibers on one face of the air pervious member and to bond the collected fibers together to form a nonwoven fabric;

(C) disposing a pattern screen defining air pervious and substantially air impervious areas as the suction box cover, thereby to cause the fibers to be collected on the one face of the air pervious member in a pattern of fabric density determined by the pattern on the pattern screen, the pattern defining an air pervious area/substantially air impervious area ratio which is greater in MD than in CD, thereby to provide a fabric with a higher percent elongation in CD than in MD; and (D) separating the collected fibers from the air pervious member.

18. The method of claim 17 wherein the air impervious areas of the pattern screen reflect a blockage of apertures in the air pervious member or the pattern screen is disposed to at least one side of the plane of the suction box cover.

19. The method of claim 17 wherein the fibers are collected in a pattern determined by the pattern on the pattern screen to provide a fabric with a higher tensile strength in the MD than in the CD.

20. The method of claim 17 wherein the pattern defines an elongated relatively air pervious area and an elongated relatively air impervious area.

* * * * *